(12) United States Patent
Bowman et al.

(10) Patent No.: US 12,162,100 B2
(45) Date of Patent: Dec. 10, 2024

(54) WELDING POWER SUPPLIES HAVING DYNAMIC CURRENT RESPONSES

(71) Applicant: ILLINOIS TOOL WORKS INC., Glenview, IL (US)

(72) Inventors: Cody J. Bowman, Appleton, WI (US); Richard Joyce, Sherwood, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1488 days.

(21) Appl. No.: 16/362,254

(22) Filed: Mar. 22, 2019

(65) Prior Publication Data

US 2019/0291201 A1 Sep. 26, 2019

Related U.S. Application Data

(60) Provisional application No. 62/646,958, filed on Mar. 23, 2018.

(51) Int. Cl.
*B23K 9/095* (2006.01)
*B23K 9/10* (2006.01)

(52) U.S. Cl.
CPC .......... *B23K 9/0953* (2013.01); *B23K 9/1062* (2013.01)

(58) Field of Classification Search
CPC . B23K 9/00; B23K 9/09; B23K 9/095; B23K 9/0952; B23K 9/0953; B23K 9/0956; B23K 9/10; B23K 9/1056; B23K 9/1062; B23K 9/1043; B23K 9/1006; B23K 9/173
USPC .................................................. 219/130.33
See application file for complete search history.

(56) References Cited

U.S. PATENT DOCUMENTS

| | | | | |
|---|---|---|---|---|
| 4,090,057 A | * | 5/1978 | Okada | B23K 9/167 219/122 |
| 4,485,293 A | * | 11/1984 | Tabata | B23K 9/092 219/130.33 |
| 5,625,276 A | * | 4/1997 | Scott | F02B 75/16 310/156.01 |

(Continued)

FOREIGN PATENT DOCUMENTS

| | | |
|---|---|---|
| CN | 1033448 | 6/1989 |
| CN | 102441728 | 5/2012 |

(Continued)

OTHER PUBLICATIONS

Int' Search Report and Written Opinion for PCT/US2017/039866 dated Oct. 13, 2017.

(Continued)

*Primary Examiner* — Eric S Stapleton
(74) *Attorney, Agent, or Firm* — McAndrews, Held & Malloy, Ltd.

(57) ABSTRACT

Welding power supplies having dynamic current responses are disclosed. Example welding power supplies include: power conversion circuitry configured to convert supply power to welding current; a voltage sense circuit configured to measure an output voltage of the power conversion circuitry; and control circuitry configured to: in response to detecting that the output voltage has decreased below a lower voltage limit: control an increasing ramp rate of the welding current output by the power conversion circuitry; and in response to detecting that the output voltage has increased above the lower voltage limit, control a decreasing ramp rate of the welding current output by the power conversion circuitry.

20 Claims, 12 Drawing Sheets

(56) References Cited

U.S. PATENT DOCUMENTS

| | | | | |
|---|---|---|---|---|
| 6,479,794 B1* | 11/2002 | Sykes | B23K 9/1043 | 219/133 |
| 7,304,269 B2* | 12/2007 | Fulmer | B23K 9/09 | 219/130.21 |
| 9,623,507 B2* | 4/2017 | Shigeyoshi | B23K 9/0956 | |
| 10,688,582 B2* | 6/2020 | Yoshida | B23K 9/0732 | |
| 10,688,583 B2* | 6/2020 | Smith | B23K 9/0953 | |
| 2003/0111452 A1* | 6/2003 | Ihde | B23K 9/173 | 219/130.21 |
| 2005/0061791 A1* | 3/2005 | Matus | B23K 9/1006 | 219/130.21 |
| 2008/0296265 A1* | 12/2008 | Hiroi | B23K 9/1012 | 219/72 |
| 2010/0224606 A1* | 9/2010 | Hutchison | B23K 9/0953 | 219/130.21 |
| 2011/0226749 A1* | 9/2011 | Sato | B23K 9/0671 | 219/130.31 |
| 2011/0248012 A1* | 10/2011 | Fujiwara | B23K 9/1012 | 219/136 |
| 2012/0298643 A1* | 11/2012 | Lambert | B23K 9/10 | 219/130.21 |
| 2013/0056453 A1* | 3/2013 | Fujiwara | B23K 9/1012 | 219/130.31 |
| 2013/0114306 A1* | 5/2013 | Kooken | H02M 1/10 | 363/21.01 |
| 2013/0262000 A1* | 10/2013 | Hutchison | B23K 9/09 | 702/58 |
| 2014/0001166 A1* | 1/2014 | Peters | B23K 9/1006 | 219/130.1 |
| 2014/0097164 A1* | 4/2014 | Beistle | B23K 9/1012 | 219/130.33 |
| 2014/0263239 A1* | 9/2014 | Peters | B23K 9/09 | 219/130.21 |
| 2014/0367370 A1* | 12/2014 | Hutchison | B23K 9/1062 | 219/130.33 |
| 2015/0114940 A1* | 4/2015 | Hutchison | B23K 9/0953 | 219/130.33 |
| 2015/0283652 A1* | 10/2015 | Pfeifer | B23K 9/0953 | 219/130.21 |
| 2015/0375331 A1* | 12/2015 | Hutchison | B23K 9/09 | 219/136 |
| 2016/0361773 A1* | 12/2016 | Knoener | B23K 9/173 | |
| 2017/0225254 A1* | 8/2017 | Ulrich | B23K 9/0953 | |
| 2017/0317628 A1* | 11/2017 | Renner | G05F 1/02 | |
| 2018/0021872 A1* | 1/2018 | Smith | B23K 9/0956 | 219/130.33 |
| 2019/0091790 A1* | 3/2019 | Mnich | B23K 9/1006 | |
| 2019/0291201 A1* | 9/2019 | Bowman | B23K 9/1062 | |
| 2022/0055140 A1* | 2/2022 | Bowman | B23K 9/173 | |

FOREIGN PATENT DOCUMENTS

| | | |
|---|---|---|
| CN | 203151378 | 8/2013 |
| CN | 107073624 | 8/2017 |
| EP | 2292362 | 3/2011 |
| WO | 2011147460 | 12/2011 |
| WO | 2011147461 | 12/2011 |

OTHER PUBLICATIONS

Int' Search Report and Written Opinion for PCT/US2019/023660 mailed Jul. 17, 2019.

Canadian Office Action AppIn No. 3,030,248 dated Sep. 26, 2019 (6 pgs).

Dallos, Jennifer, Shielded Metal Arc Welding Basics, FABTECH, Jan. 4, 2018.

Internet Archive snapshot captured Jul. 23, 2003 <https://web.archive.org/web/20030723125054/http://esabna.com/EUWeb/MIG_handbook/592mig1_3.htm>.

Internet Archive snapshot captured Jul. 25, 2003 <https://web.archive.org/web/20030725130155/https://www.esabna.com/euweb/mig_handbook/592mig1_4.htm>.

Canadian Office Action AppIn No. 3,030,248 dated Jun. 22, 2020 (5 pgs).

Canadian Office Action AppIn No. 3,093,111 dated Oct. 28, 2021.

\* cited by examiner

WELDING POWER SUPPLIES HAVING DYNAMIC CURRENT RESPONSES

RELATED APPLICATIONS

This patent claims priority to U.S. Provisional Patent Application No. 62/646,958, filed Mar. 23, 2018, entitled "WELDING POWER SUPPLIES HAVING DYNAMIC CURRENT RESPONSES." The entirety of U.S. Provisional Patent Application No. 62/646,958 is incorporated herein by reference.

BACKGROUND

This disclosure relates generally to welding systems and, more particularly, to welding power supplies having dynamic current responses.

In the past, the stick welding market and, more specifically pipe welding applications, has been dominated by DC generator welding machines. The arc/welding characteristics inherent in a DC generator, which are determined by the magnetic design of the machine, provide high quality performance for pipe welding applications. The machine response can be changed by selecting taps on the DC generator magnetics and/or changing the resistance in the generator field circuit. Conventional electronic controlled inverter/high frequency switching welding power sources have not replicated the welding characteristics of a DC generator that make the DC generator attractive for stick welding applications. While the desirable behaviors are inherent in DC generators, such behaviors are not present in conventional high frequency switching welding power sources.

SUMMARY

Welding power supplies having dynamic current responses are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
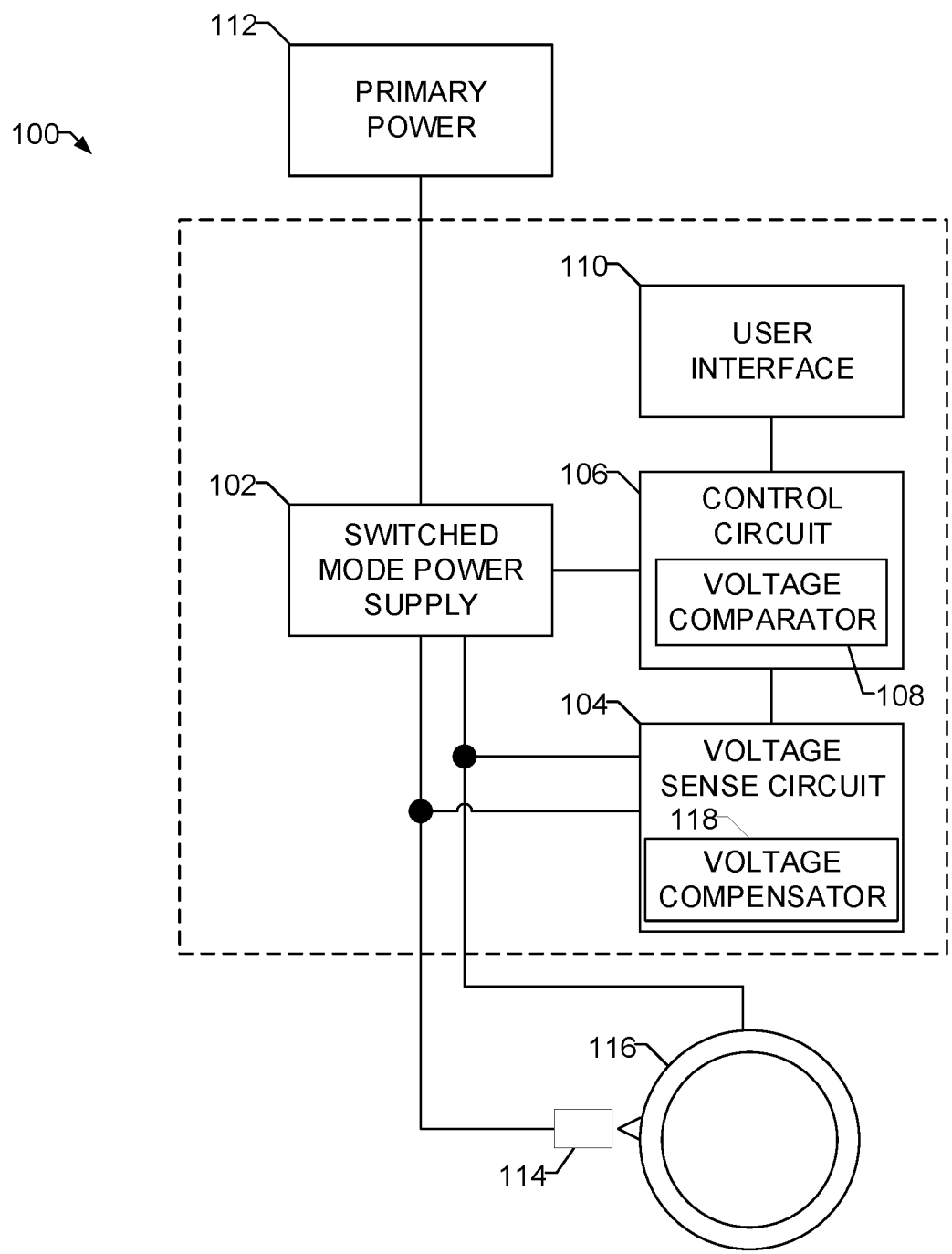
FIG. 1 is a schematic diagram of an example welding power supply having adjustable current ramping rates, in accordance with aspects of this disclosure.

Disclosed examples provide a method for controlling the current response for stick welding processes. In stick welding, a short circuit occurs as a droplet of molten metal is transferred from the end of the welding electrode to the weld pool.

Conventionally, electronic/inverter welding power sources have controlled the welding current response during a short circuit by limiting the maximum short circuit current that the power source can deliver. The maximum short circuit current is controlled by the operator through what is called the "dig" control or "arc force" control. Conventionally, "dig" control or "arc force" control is accomplished through a knob or other adjustment on the user interface of the power source. Conventionally, the rate of rise of the current is fixed for inverter power supplies, and does not change as the arc force control setting (i.e., current limit) was increased or decreased.

Disclosed examples provide control over increasing ramp rates of the current, hold amperages and/or dwell times, and/or decreasing ramp rates of the current in a short circuit condition. Disclosed examples implement a current control loop in software executed by a control circuit, such as a microcontroller that controls the weld output of an inverter or switched mode power supply.

Disclosed examples reproduce or mimic portions of the response of a DC generator and allows the operator more freedom to manipulate the weld. Disclosed examples enable a tighter arc length to be maintained in stick welding pipe joints without causing sticking of the electrode to the pipe, which gives more flexibility between the various weld conditions, joint fit-up, and other pipe joint welding parameters. Disclosed examples also improve the speed and reliability for the operator to weld a pipe joint.

The terms "current" and "amperage" are used interchangeably herein.

Disclosed example welding power supplies include power conversion circuitry, a voltage sense circuit, and control circuitry. The power conversion circuitry converts supply power to welding current. The voltage sense circuit measures an output voltage of the power conversion circuitry. When the output voltage is between a first upper voltage limit and a lower voltage limit, the control circuitry controls the power conversion circuitry to output the welding current to substantially match an amperage parameter. When the output voltage is above the first upper voltage limit and below a second upper voltage limit, the control circuitry controls the power conversion circuitry to output the welding current based on a first voltage-amperage relationship. In response to detecting that the output voltage has decreased below the lower voltage limit, the control circuitry controls an increasing ramp rate of the welding current output by the power conversion circuitry and, in response to detecting that the output voltage has increased above the lower voltage limit, controls a decreasing ramp rate of the welding current output by the power conversion circuitry.

Some example welding power supplies further include an engine to drive a generator, in which the generator provides the supply power to the power conversion circuitry. Some example welding power supplies further include a user interface configured to receive the amperage parameter.

In some examples, the control circuitry controls the power conversion circuitry to output the welding current based on the first voltage-amperage relationship by controlling the power conversion circuitry based on the amperage parameter according to an inverse voltage-amperage relationship. Some example welding power supplies further include a user interface to receive an input specifying the inverse voltage-amperage relationship, in which the control circuitry determines the inverse voltage-amperage relationship based on the input. In some examples, the control circuitry increases the welding current above the current specified by the amperage parameter between 1.5 amperes per volt (A/V) above the first upper voltage limit and 3.0 A/V above the first upper voltage limit based on the input.

In some examples, the control circuitry controls the increasing ramp rate of the welding current output by the power conversion circuitry by: controlling the power conversion circuitry to increase the welding current at a first rate; controlling the power conversion circuitry to increase the welding current at a second rate less than the first rate; and controlling the power conversion circuitry to output the welding current at a hold amperage. Some example welding power supplies further include an input device to receive an input, in which the control circuitry controls, based on the input, one or more of: the amperage parameter, the first rate, the second rate, the hold amperage, or the first voltage-amperage relationship.

In some examples, the control circuitry controls the power conversion circuitry to increase the welding current at the first rate up to a first threshold amperage, and controls the power conversion circuitry to increase the welding current at the second rate from the first threshold amperage to the hold amperage. Some such examples further include an input device to receive an input, in which the control circuitry controls, based on the input, one or more of: the amperage parameter, the first rate, the second rate, the hold amperage, the first threshold amperage, or the first voltage-amperage relationship.

In some examples, the control circuitry controls the power conversion circuitry to continue to output the welding current at the amperage parameter for a first time period following detecting that the output voltage has decreased below the lower voltage limit. After the first time period, the control circuitry controls the power conversion circuitry to increase the welding current from the amperage parameter by an amperage step, and controls the power conversion circuitry to begin the increasing of the welding current at the first rate.

In some example welding power supplies, the control circuitry, in response to detecting that the output voltage has not increased above the lower voltage limit within a threshold time period while controlling the power conversion circuitry to output the welding current at the hold amperage: increases the welding current at a third rate up to a second hold amperage; and controls the power conversion circuitry to output the welding current at the second hold amperage.

In some examples, the control circuitry controls the decreasing ramp rate of the welding current output by the power conversion circuitry by: controlling the power conversion circuitry to decrease the welding current at a third rate; and controlling the power conversion circuitry to decrease the welding current at a fourth rate less than the third rate. In some such examples, the control circuitry controls the power conversion circuitry to decrease the welding current at the third rate until the welding current satisfies a threshold or for a threshold time period. In some examples, the third rate is based on the first rate and the fourth rate is based on the second rate.

In some examples, the second rate is between 0.5 amperes per 100 microseconds (A/µs) and 2.5 amperes per 100 microseconds. In some examples, the first rate is based on the second rate. In some examples, the first upper voltage limit is between 23 and 24 volts. In some examples, the lower voltage limit is between 18.5 and 19.5 volts. In some examples, the lower voltage limit is approximately 19 volts. In some examples, a difference between the first upper voltage limit and the lower voltage limit is between 3 and 6 volts. In some such examples, the difference between the first upper voltage limit and the lower voltage limit is between 4 and 5 volts.

In some example welding power supplies, the control circuitry controls the decreasing ramp rate of the welding current output by the power conversion circuitry by: controlling the power conversion circuitry to decrease the welding current at a first rate; and controlling the power conversion circuitry to decrease the welding current at a second rate less than the first rate. Some example welding power supplies further include a voltage compensator to modify at least one of the lower voltage limit, the first upper voltage limit, or the second upper voltage limit based on a calculated voltage drop in at least one of a weld cable or a work cable. In some examples, the voltage sense circuit is configured to measure the output voltage proximate an arc generated using the welding current.

FIG. 1 is a schematic diagram of an example welding power supply 100 having adjustable current ramping rates. The example welding power supply 100 is a power conversion circuitry 102, a voltage sense circuit 104, a control circuitry 106, a voltage comparator 108, and a user interface 110. The example welding power supply 100 enables a welder to perform shielded metal arc welding (SMAW), also referred to as "Stick" welding.

The power conversion circuitry 102 of FIG. 1 converts primary power 112 to welding-type power. Example power conversion circuitry 102 may include a switched mode power supply (or "inverter") topology. The primary power 112 may be any suitable power source, such as utility (e.g., mains) power, engine/generator power, and/or any combination of utility power and engine power. The welding-type power has an output current based on a current control loop. For example, the output current and/or weld voltage may be controlled based on a current setpoint and/or a voltage setpoint selected via the user interface 110. The power conversion circuitry 102 outputs weld power to a weld torch 114, such as a stick electrode holder. The weld torch 114 facilitates establishing a welding arc at a workpiece 116.

The voltage sense circuit 104 measures the weld voltage. The weld voltage may refer to the output voltage of the welding power supply 100 and/or a measured arc voltage. In the example of FIG. 1, the voltage sense circuit 104 samples or measures the weld voltage at the output studs of the welding power supply 100. In some other examples, the voltage sense circuit 104 may include sense leads to measure a weld voltage at the workpiece 116 and/or at another location in the weld circuit.

The measured weld voltage is passed through an analog filter circuit. An example filter is a 4th order filter with a corner frequency of 4 KHz. The output voltage feedback is supplied to the control circuitry 106. The voltage sense circuit 104 and/or the voltage comparator 108 may implement an analog-to-digital converter to convert the voltage to a digital value. The control circuitry 106 also filters the voltage feedback via software, firmware, and/or hardware. In some examples, the output voltage is compensated for voltage drops that occur over the weld cables.

The control circuitry 106 controls the output current and/or weld voltage output by the power conversion circuitry 102 using a current control loop. The user interface 110 may include a user input device to receive an amperage parameter (e.g., an output current setpoint). The control circuitry 106 executes the current control loop based on the output voltage information provided by the voltage sense circuit 104.

In some examples the current control loop is implemented by the power conversion circuitry 102. The voltage comparator 108 and the calculations to increase and/or decrease the current are implemented in software executed by the control circuitry 106, which outputs a current command as an output to the current control loop implemented by the power conversion circuitry 102. In some other examples, the current control loop is implemented in software executed by the control circuitry 106, which controls the weld output of the power conversion circuitry 102.

The voltage comparator 108 of the control circuitry 106 compares the measured output voltage to one or more thresholds to determine a current control scheme. For example, when the voltage comparator 108 determines that the output voltage is between a first upper voltage limit and a lower voltage limit (e.g., within a constant current mode range), the control circuitry 106 controls the power conversion circuitry 102 to output the welding current to substantially match an amperage parameter (e.g., regardless of the output voltage within that range).

When the voltage comparator 108 determines that the output voltage is below the lower voltage limit, the example control circuitry 106 may control the output current using a short circuit mode or dig mode. In the dig mode, the example control circuitry 106 attempts to clear a short circuit condition between the electrode and the workpiece 116. An example dig mode control technique involves controlling one or more increasing ramp rates of the welding current output by the power conversion circuitry 102 and, in response to detecting that the output voltage has increased above the first lower voltage limit (e.g., the short circuit has been cleared and the arc re-established), controlling one or more decreasing ramp rates of the welding current output by the power conversion circuitry 102.

The control circuitry 106 provides dynamic current responses to provide weld operators with excellent arc behavior and improved weld operator control of the arc. As described in more detail below, the control circuitry 106 controls the power conversion circuitry 102 to control the output current at least in part based on the output voltage. When the output voltage is between a first upper voltage limit and a lower voltage limit, the control circuitry 106 controls the power conversion circuitry 102 to output the welding current to substantially match an amperage parameter. When the output voltage is above the first upper voltage limit and below a second upper voltage limit, the control circuitry 106 controls the power conversion circuitry 102 to output the welding current based on a first voltage-amperage relationship. In response to detecting that the output voltage has decreased below the lower voltage limit, the control circuitry 106 controls an increasing ramp rate of the welding current output by the power conversion circuitry 102 and, in response to detecting that the output voltage has increased above the first lower voltage limit, controls a decreasing ramp rate of the welding current output by the power conversion circuitry 102.

When the voltage comparator 108 determines that the output voltage is above the first upper voltage limit and below a second upper voltage limit, the example control circuitry 106 controls the power conversion circuitry 102 to output the welding current based on a first voltage-amperage relationship (e.g., a droop mode). An example voltage-amperage relationship that may be used in the droop mode involves a decrease in current output (relative to the amperage parameter) for a corresponding increase in voltage (e.g., voltage above the first upper voltage limit). The droop mode enables a weld operator to control the current input (and, thus, the heat input) to the weld by increasing the arc length (and, thus, the arc voltage), and is particularly useful in downhill welding and/or out-of-position welding where puddle control is desired.

In some examples, the control circuitry 106 selects arc control parameters based on a arc control parameter input(s). The arc control parameter input(s) may be received from the user interface 110. For example, the user interface 110 may include a slope control input, an arc control input, a dig range input, and/or an amperage parameter input to enable a user to select or tune the arc control parameter input(s). In some examples, the user interface 110 input device mimics a tap selection and tuning selection typically found on DC generator type welding power supplies. In the example of FIG. 1, the control circuitry 106 executes the current control loop at a rate of at least 15 kilohertz (kHz).

Additionally or alternatively, the user interface 110 may enable selection of different stick welding operations, such as 6010 stick rod welding, 7018 stick rod welding, downhill pipe welding, or the like, as the arc control parameter input(s). The control circuitry 106 may select predetermined arc control parameters based on the selected stick welding operation.

In some examples, the control circuitry 106 may automatically identify the stick welding operation (e.g., rod type) and select the predetermined current ramping rate based on the stick welding operation. The control circuitry 106 may identify a particular rod type by, for example, reading an identifier attached to the rod and/or observing characteristics of the weld such as frequency and/or duration of short circuit events. For example, certain types of stick electrodes may result in short circuit events occurring within a range of frequencies.

In some examples, the control circuitry 106 identifies welding data corresponding to the output current, the weld voltage, a weld parameter input to the control circuitry 106, an electrode size, and/or an electrode type. The control circuitry 106 may select amperage and/or arc control parameters using welding data. For instance, a welder may specify a size and/or type of stick electrode via the user interface 110. In response, the control circuitry 106 identifies and selects a pre-tuned current ramping rate for use with the specified electrode.

In some examples, the control circuitry 106 stores weld data corresponding to a welding operation (e.g., one or more prior welding operations performed by an operator). The control circuitry 106 may select the arc control parameters using the stored data as the arc control parameter input(s). For example, the stored weld data may indicate how many short circuits occur during a time period to determine a short circuit rate. The control circuitry 106 may select the current ramping rate to adapt the dig response to the short circuit rate.

Example types of arc control parameters are described herein. The control circuitry 106 may use combinations of inputs to select the arc control parameters.

The control circuitry 106 executes the current control loop to control the output current. In the example of FIG. 1, the control circuitry 106 increases the output current at the current ramping rate while the weld voltage corresponds to the short circuit condition. The control circuitry 106 may monitor the weld voltage during a short circuit to identify when a short circuit is about to clear. For example, when the weld voltage begins increasing (or increases for a certain number of consecutive samples), the control circuitry 106 may stop increasing the current to reduce the spatter that results from clearing the short circuit.

In some examples, the voltage sense circuit 104 includes a voltage compensator 118 to estimate an arc voltage based on one or more inputs. To estimate the arc voltage, the voltage compensator 118 may estimate a voltage drop caused by the weld cable and/or work cable, where the voltage drop would substantially affect the performance of the voltage thresholds. Example inputs that may be used to estimate the arc voltage and/or the voltage drop may include the output voltage, a weld cable resistance, a work cable resistance, an output current, and/or an output inductance.

Figure 2:
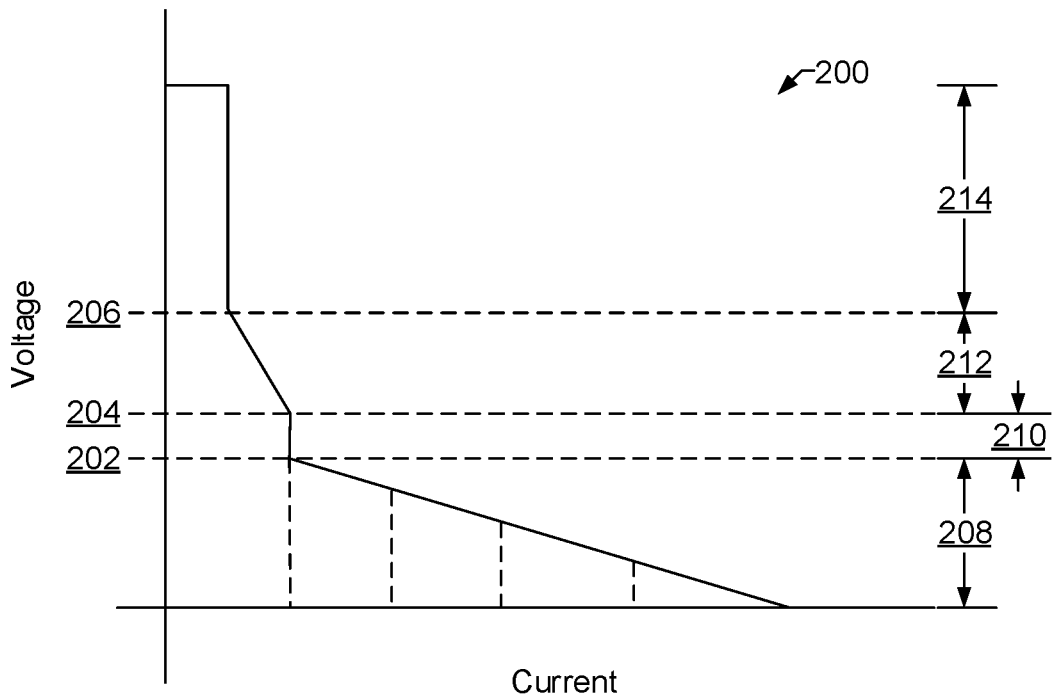
FIG. 2 is graph illustrating an example voltage-amperage relationship that may be used by the example welding power supply of FIG. 1 to provide welding power.

FIG. 2 is graph illustrating an example voltage-amperage relationship 200 that may be used by the example welding power supply 100 of FIG. 1 to provide welding power. The example voltage-amperage relationship 200 of FIG. 2 may be defined as an output amperage set according to the output voltage, and includes three example voltage limits 202, 204, 206 and four voltage ranges 208, 210, 212, 214. The example voltage range 214 corresponds to an open circuit in which no arc is present.

The control circuitry 106 operates in a dig mode within the voltage range 208, when the output voltage is below the lower voltage limit 202. The dig range 208 may be used by the control circuitry 106 of FIG. 1 to clear short circuit events while reducing spatter and/or electrode degradation. Example responses by the control circuitry 106 to measured output voltages below the lower voltage limit 202 are described below with reference to FIGS. 3A, 3B, 3C, 3D, 4A, and 4B.

The control circuitry 106 operates in a current-controlled mode (e.g., a constant current mode, etc.) within voltage range 210, when the output voltage is between the lower voltage limit 202 and a first upper voltage limit 204. In the current-controlled mode 210, the control circuitry 106 controls the power conversion circuitry 102 using a current control loop to maintain a substantially constant current output. The control circuitry 106 may maintain the current output substantially equal to the amperage parameter input via the user interface 110 to provide consistent output expected by the weld operator.

An example voltage range 210 is between 3-6 volts or, more specifically, between 4-5 volts. An example nominal lower voltage limit 202 is about 19V and an example nominal first upper voltage limit 204 is between about 23V and about 24V, inclusive. The nominal lower voltage limit 202 and/or the nominal upper voltage limit 204 may be modified by the control circuitry 106 and/or the voltage compensator 118 based on detecting substantial voltage drops in the weld cable and/or the work cable. Substantial voltage drops when operating the power conversion circuitry 102 in a current-controlled mode results in an increase in the output voltage at the power conversion circuitry 102.

The control circuitry 106 operates in a droop mode within voltage range 212, when the output voltage is between the first upper voltage limit 204 and the second upper voltage limit 206. In the droop mode, the control circuitry 106 decreases the output current as a function of an increase in the output voltage above the second upper voltage limit 206.

A number of parameters of the voltage-amperage relationship 200 may be modified by the weld operator. For example, the amperage in the dig mode may be limited to limit the current that can be output to clear short circuits. As illustrated in FIG. 2, example limits 216a, 216b, 216c, 216d may be implemented, although any other limit between the amperage parameter and the maximum current output capability of the power conversion circuitry 102 may be used. When the output current reaches the configured limit 216a, 216b, 216c, 216d, the output current does not exceed the configured limit 216a, 216b, 216c, 216d.

The example voltage limits 202, 204, 206 may be modified via the user interface 110 and/or via the voltage compensator 118. For example, the voltage limits 202-206 may be increased based on an increase in the voltage drop over the weld and work cables. In some examples, the voltage limits 202, 204 defining the current-controlled mode (e.g., the voltage range 210) are constrained to be have a difference between 4-5 volts.

The slope of the droop mode may be adjusted to increase or decrease the current reduction per unit increase in output voltage. In some examples, the slope may be set between −1.5 amperes per volt (A/V) and −3.0 A/V. The current reduction is made relative to the amperage parameter, which may also be adjusted to control the output current in current-controlled mode (e.g., the voltage range 210) (e.g., moving the vertical portion of the voltage-amperage relationship 200 within the voltage range 210 to the left or right).

Figure 3A:
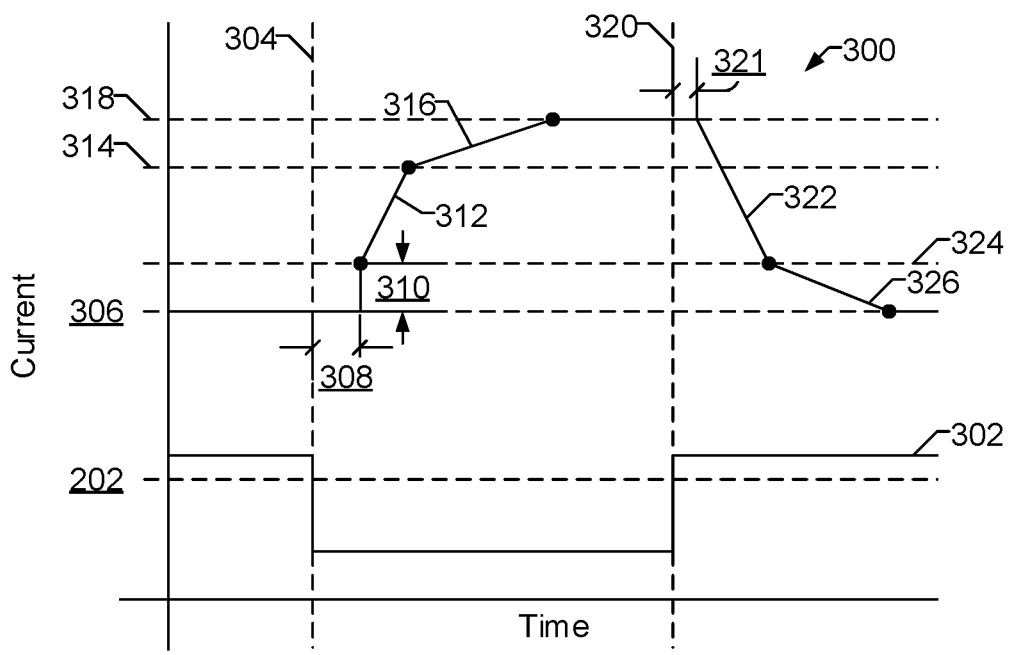
FIGS. 3A-3D are graphs illustrating example current responses that may be implemented by the welding power supply of FIG. 1 in response to detecting a drop in output voltage below a lower voltage threshold.

FIG. 3A is a graph illustrating an example current response 300 that may be implemented by the welding power supply 100 of FIG. 1 in response to detecting a drop in output voltage 302 below a lower voltage threshold (e.g., the lower voltage limit 202 of FIG. 2). The example current response 300 is described below with reference to the welding power supply 100 of FIG. 1 during a short circuit event, in which an electrode makes contact with the workpiece during a welding operation. The current response 300 and the output voltage 302 are simplified for clarity.

Generally, in response to detecting that the output voltage has decreased below the lower voltage limit, the control circuitry 106 controls an increasing ramp rate of the welding current output by the power conversion circuitry 102 and, in response to detecting that the output voltage 302 has increased above the lower voltage limit 202, controls a decreasing ramp rate of the welding current 300 output by the power conversion circuitry 102. As illustrated in FIGS. 3A, 3B, 3C, and 3D, other increasing and/or decreasing ramp rates, constant amperage periods, and/or current steps may be included in the current response 300.

In the example of FIG. 3A, prior to a short circuit event 304, the control circuitry 106 controls the power conversion circuitry 102 to be substantially equal to an amperage parameter 306. At the first time 304, the output voltage 302 drops below the lower voltage limit 202. The control circuitry 106 continues to control the current output to be equal to the amperage for a whetting time 308. The whetting time 308 permits the welding power supply 100 to ride through whisker shorts, in which the short circuit is negligible and is cleared without an increased current output.

When the output voltage 302 is below the lower voltage limit 202 after the whetting time 308, the control circuitry 106 controls the power conversion circuitry 102 to increase the current 300 by a current step 310 and then increase the current 302 at a first increasing ramp rate 312 up to a first threshold amperage 314. At the first threshold amperage 314, the control circuitry 106 controls the power conversion circuitry 102 to increase the current 302 at an second increasing ramp rate 316 up to a hold amperage 318. In the example of FIG. 3A, the first increasing ramp rate 312 is greater than the second increasing ramp rate 316. In some examples, the second increasing ramp rate 316 is determined based on the first increasing ramp rate 312, or vice versa.

The current step 310 may be determined as an amount corresponding to the product of the whetting time 308 multiplied by the first increasing ramp rate 312. However, other current steps calculations may be used, and/or the current step 310 may be adjustable via the user interface 110 (e.g., adjustable independently and/or in conjunction with other parameters).

The control circuitry 106 controls the power conversion circuitry 102 to output the current 302 at the hold amperage 318 for up to a dwell time. In the example of FIG. 3, at time 320, the short circuit is cleared and the arc is reestablished, thereby increasing the output voltage 302 above the lower voltage limit 202. After detecting that the output voltage 302 exceeds the lower voltage limit 202, the control circuitry 106 continues to hold the output current at the hold amperage (or the amperage at which the output voltage 302 exceeds the lower voltage limit 202, if the short circuit is cleared while the current is increasing) for an additional dwell time 321 prior to beginning to decrease the current. The dwell time 321 may be adjustable and/or fixed. Example dwell times 321 may be, for example, between 1-2 milliseconds (ms).

Following the dwell time 321, the control circuitry 106 controls the power conversion circuitry 102 to decrease the current 302 at a first decreasing ramp rate 322 to a threshold current amperage 324. At the second threshold amperage 324, the control circuitry 106 controls the power conversion circuitry 102 to decrease the current 302 at a second decreasing ramp rate 326 to the amperage parameter 306. In some examples, the first decreasing ramp rate 322 is equal (but opposite) the first increasing ramp rate 312, and the second decreasing ramp rate 326 is equal (but opposite) the second increasing ramp rate 316.

Any one or more of the amperage parameter 306, the whetting time 308, the current step 310, the first increasing ramp rate 312, the first threshold amperage 314, the second increasing ramp rate 316, the hold amperage 318, the dwell time 320, the first decreasing ramp rate 322, the second threshold amperage 324, or the second decreasing ramp rate 326 may be configured by the weld operator. For example, the user interface 110 may enable a weld operator to increase, decrease, eliminate, add, and/or otherwise modify any or all of the example parameters 306-326. In some examples, to simply control, two or more of the parameters 306-326 are configured in conjunction based on a same input to the user interface 110. Additionally or alternatively, any one or more of the parameters 306-326 may be configured in conjunction with one or more of the parameters of the voltage-amperage relationship 200 based on a same input to the user interface 110.

Figure 3B:
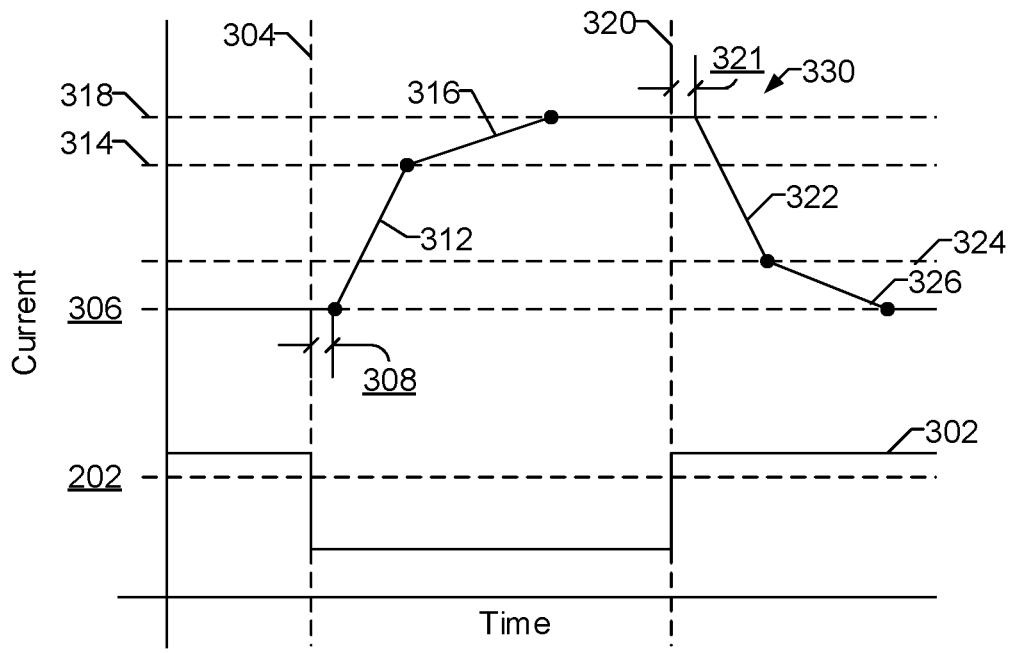

FIG. 3B illustrates another example current response 330, illustrating a modification from the current response 300 of FIG. 3A. In the current response 330, the current step 310 is reduced to zero, and the first increasing ramp rate 312 is used to increase the current 330 from the amperage parameter 306.

Figure 3C:
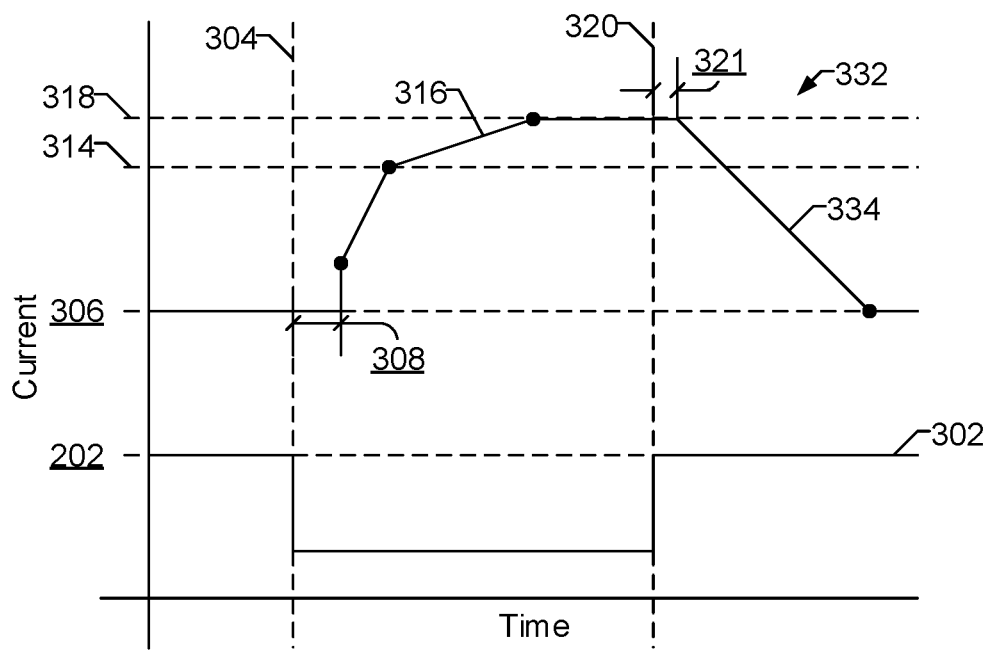

FIG. 3C illustrates another example current response 332, illustrating a modification from the current response 300 of FIG. 3A. In the current response 332, a single decreasing ramp rate 334 is used following the increase of the output voltage 302 above the lower voltage limit 202.

Figure 3D:
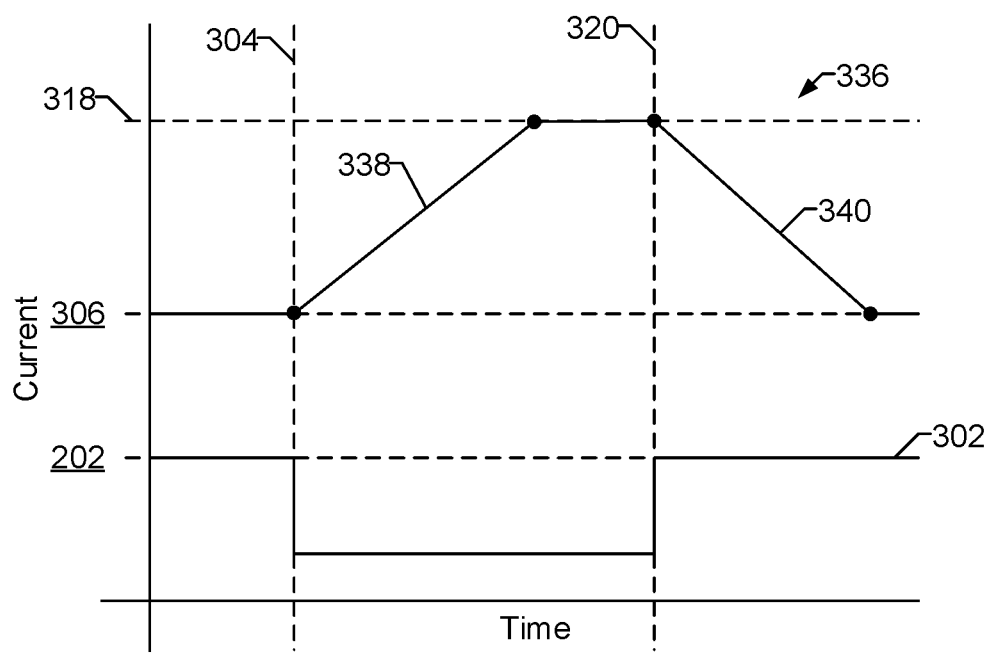

FIG. 3D illustrates another example current response 336. In the current response 336, a single increasing ramp rate 338 is used, without a wetting time. Similarly, a single decreasing ramp rate 340 is used following the increase of the output voltage 302 above the lower voltage limit 202, also without a dwell time.

As mentioned above, any other modifications to the current response may be made in accordance with a desired arc characteristic. Some modifications to the parameters 306-326 may result in a narrower, more penetrating arc, while other modifications to the parameters 306-326 may result in a more fluid, less penetrating arc.

Figure 4A:
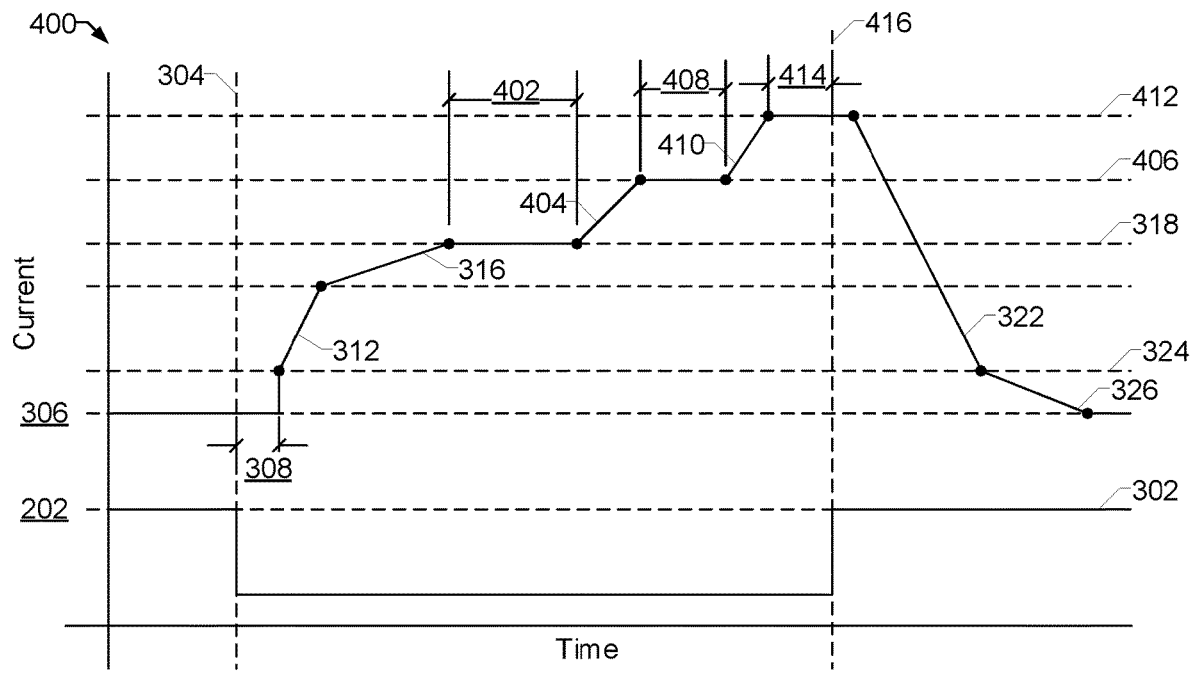
FIGS. 4A and 4B are graphs illustrating example current responses that may be implemented by the welding power supply of FIG. 1 in response to detecting a drop in output voltage below a lower voltage threshold and failure of the voltage to return above the lower voltage threshold within a time limit.

FIG. 4A is a graph illustrating another example current response 400 that may be implemented by the welding power supply 100 of FIG. 1 in response to detecting a drop in the output voltage 302 below the lower voltage limit 202 and failure of the output voltage 302 to return above the lower voltage limit 202 within a time limit. The example time limit may be calculated from a beginning of a short time circuit (e.g., the time 304) and/or at the expiration of a designated dwell time 402 at the hold amperage 318. The hold amperage 318 and the dwell time 402 may be calibrated to clear a large majority of short circuit events. However, for short circuit events that are not cleared, the example control circuitry 106 further increases the output current and/or holds the output current at hold levels, up to a maximum output current of the power conversion circuitry 102, to further attempt to clear the short circuit.

In response to detecting that the output voltage 302 has not increased above the lower voltage limit 202 within the threshold time period (e.g., while controlling the power conversion circuitry 102) to output the current at the hold amperage 318), the control circuitry 106 increases the current at an increasing ramp rate 404 up to a hold amperage 406, and controls the power conversion circuitry 102 to output the current at the second hold amperage 406 for a dwell time 408. If the short circuit is not cleared by the end of the dwell time 408, the control circuitry 106 increases the current at another increasing ramp rate 410 up to another hold amperage 412, and controls the power conversion circuitry 102 to output the current at the hold amperage 412 for a dwell time 414.

In the example of FIG. 4A, at a time 416, the short circuit is cleared and the output voltage 302 increases above the lower voltage threshold. In response to the voltage increase, the control circuitry 106 controls the power conversion circuitry 102 to decrease the output current 302 at the decreasing ramp rates 322, 326 to the amperage parameter 306.

While the example time 416 is illustrated in FIG. 4A, the short circuit may be cleared at any time. The control circuitry 106 monitors the voltage measurements captured by the voltage sense circuit 104 to determine the time at which the output voltage 302 exceeds the lower voltage limit 202. On the other hand, if the short circuit is not cleared by the end of the dwell time 414, the control circuitry 106 continues to iterate increasing and holding the current until the short circuit is cleared or the upper current output limit of the power conversion circuitry 102 is reached. If the current is output at the upper current output limit for a threshold time, the example control circuitry 106 may disable the output power and display an error message to the operator (e.g., via the user interface 110).

Figure 4B:
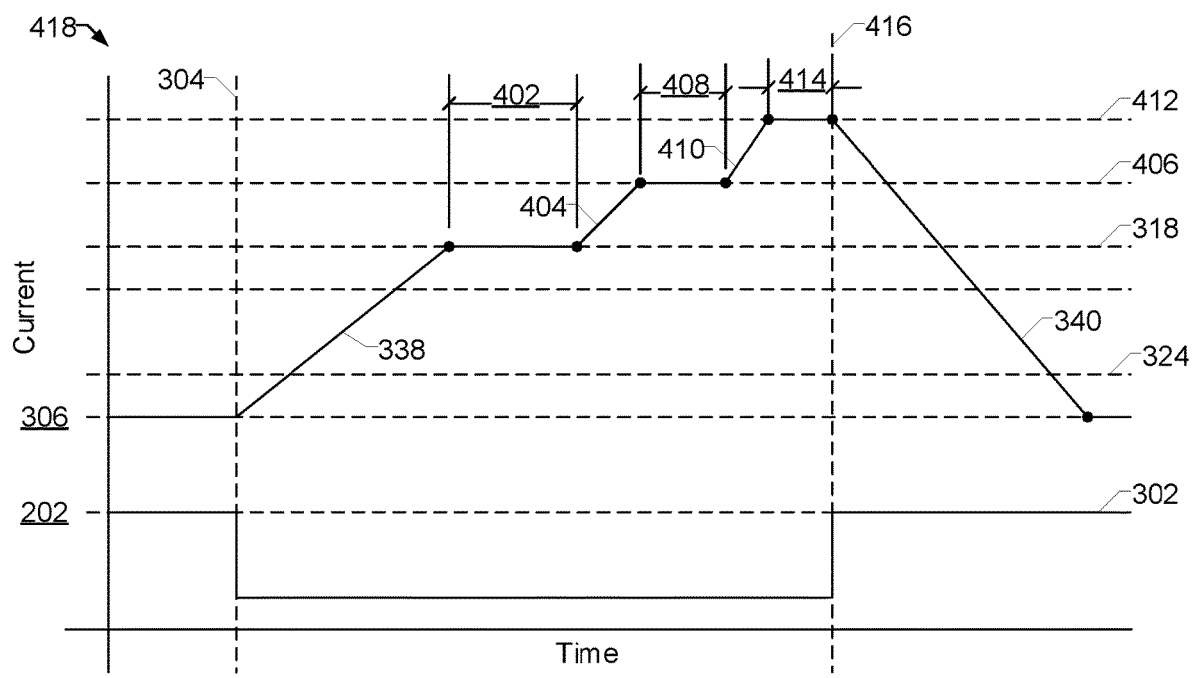

FIG. 4B illustrates another example current response 418. Like the current response 336 of FIG. 3D, the example current response 418 uses the single increasing ramp rate 338 is used, without a wetting time. The current response 418 also uses a single decreasing ramp rate 340 following the increase of the output voltage 302 above the lower voltage limit 202, also without a dwell time. Additionally, like the current response 400 of FIG. 4A, the current response 418 increases the output current above the initial hold amperage 318 when the short circuit is not cleared within the hold time 402. The control circuitry 106 continues to increase the current (e.g., current ramp rates 404, 410) to hold amperages 406, 410 until the short circuit is cleared and/or the threshold time period is reached.

While example increasing ramp rates and decreasing ramp rates are illustrated in FIGS. 3A, 3B, 3C, 3D, 4A, and 4B, other techniques for controlling the increases and/or decreases in current may be used by the control circuitry 106. For example, the increasing ramp rates and/or decreasing ramp rates may be implemented with linear or non-linear functions. Examples include logarithmic functions, exponential functions, polynomial functions, and/or any other function and/or algorithm.

Figure 5:
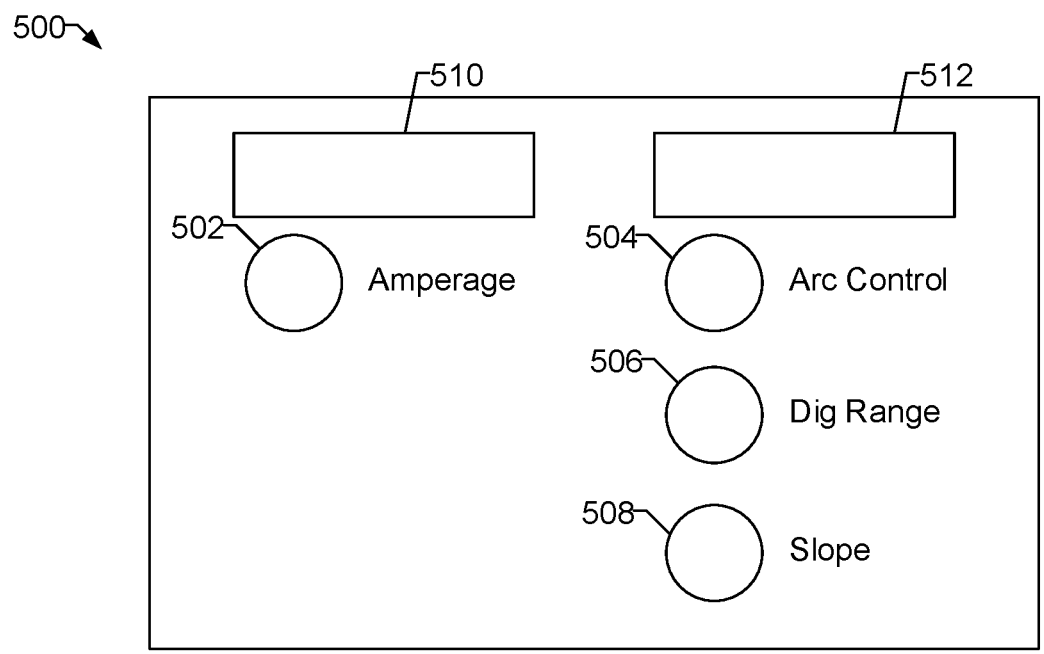
FIG. 5 illustrates an example user interface that may be used to implement a user interface of the example welding power supply of FIG. 1 to receive inputs for amperage, arc control, dig range, and/or slope parameters.

FIG. 5 illustrates an example user interface 500 that may be used to implement the user interface 110 of the example welding power supply of FIG. 1 to receive inputs for amperage, arc control, dig range, and/or slope parameters. The example user interface 500 includes input devices 502, 504, 506, 508 for the amperage, arc control, dig range, and/or slope parameters, and output devices 510, 512 to provide an indication of the current value for each of the output parameters.

The example amperage input device 502 enables the weld operator to set the amperage parameter (e.g., the output amperage in the voltage range 210 of FIG. 2).

The example arc control input device 504 receives an input from the weld operator to control the increasing ramp rate(s) 312, 316, 338, the decreasing ramp rate(s) 322, 326, 340 and/or the current step 310. Configuration of the increasing ramp rate(s) 312, 316, 338, the decreasing ramp rate(s) 322, 326, 340, and/or the current step 310 may be considered in terms of a "softer" arc (e.g., more fluid) or a "stiffer" arc (e.g., more penetrating).

The dig range input device 506 receives an input from the weld operator to set an upper limit on the short clearing current (e.g., set the hold amperage 318 of FIG. 3A). In some examples, the hold amperage 318 is separated from the increasing ramp rate(s) 312, 316 to provide greater control to the weld operator to fine tune arc characteristics, thereby providing a greater degree of arc control.

The slope input device 508 enables the weld operator to adjust the slope of the inverse voltage-amperage relationship in the droop mode (e.g., the voltage range 212). An example slope range may be −1.5 to −3 Amperes per volt (A/V) above the first upper voltage limit 204 (e.g., 23 or 24 volts, which may be modified based on weld cable voltage drop).

One or more of the input devices 502-508 may be combined into a single input device, using a menu system to access the desired parameters to be modified. In some examples, one of the input devices 504-508 (e.g., the dig range input device 506) configures a combination of droop and dig parameters, such as simultaneously increasing the hold amperage 318 (e.g., toward 150 A), increasing the threshold amperage 314, and increasing the slope (e.g., toward −3 A/V), or simultaneously decreasing the hold amperage 318 (e.g., toward 50 A), decreasing the threshold amperage 314, and decreasing the slope (e.g., toward −1.5 A/V). While a 50 A-150 A range for the hold amperage 318 is described, other ranges of amperage for the hold amperage 318 may be used. Configuring two, three, or four related parameters to a single input (e.g., while improving arc characteristics relative to conventional control schemes) reduces control by the weld operator but provides simplicity for weld operators who are uninterested in granular control.

In some other examples, the arc control input device 504 configures a combination of the ramp rate(s) 312, 316, 322, 326 and the slope parameter. For example, increasing the arc control input device may cause the increasing ramp rate(s) 312, 316, 338 and the decreasing ramp rate(s) 322, 326, 340 to have higher slopes and simultaneously increase the slope (e.g., toward −3.0 A/V). Conversely, decreasing the arc control input device may cause the increasing ramp rate(s) 312, 316, 338 and the decreasing ramp rate(s) 322, 326, 340 to have lower slopes and simultaneously decrease the slope (e.g., toward −1.5 A/V).

Additionally or alternatively, the input devices 502-508 may be combined into fewer input devices, using menus and/or other types of input devices to select one or more parameters to be configured via a given input device.

Figure 6A:
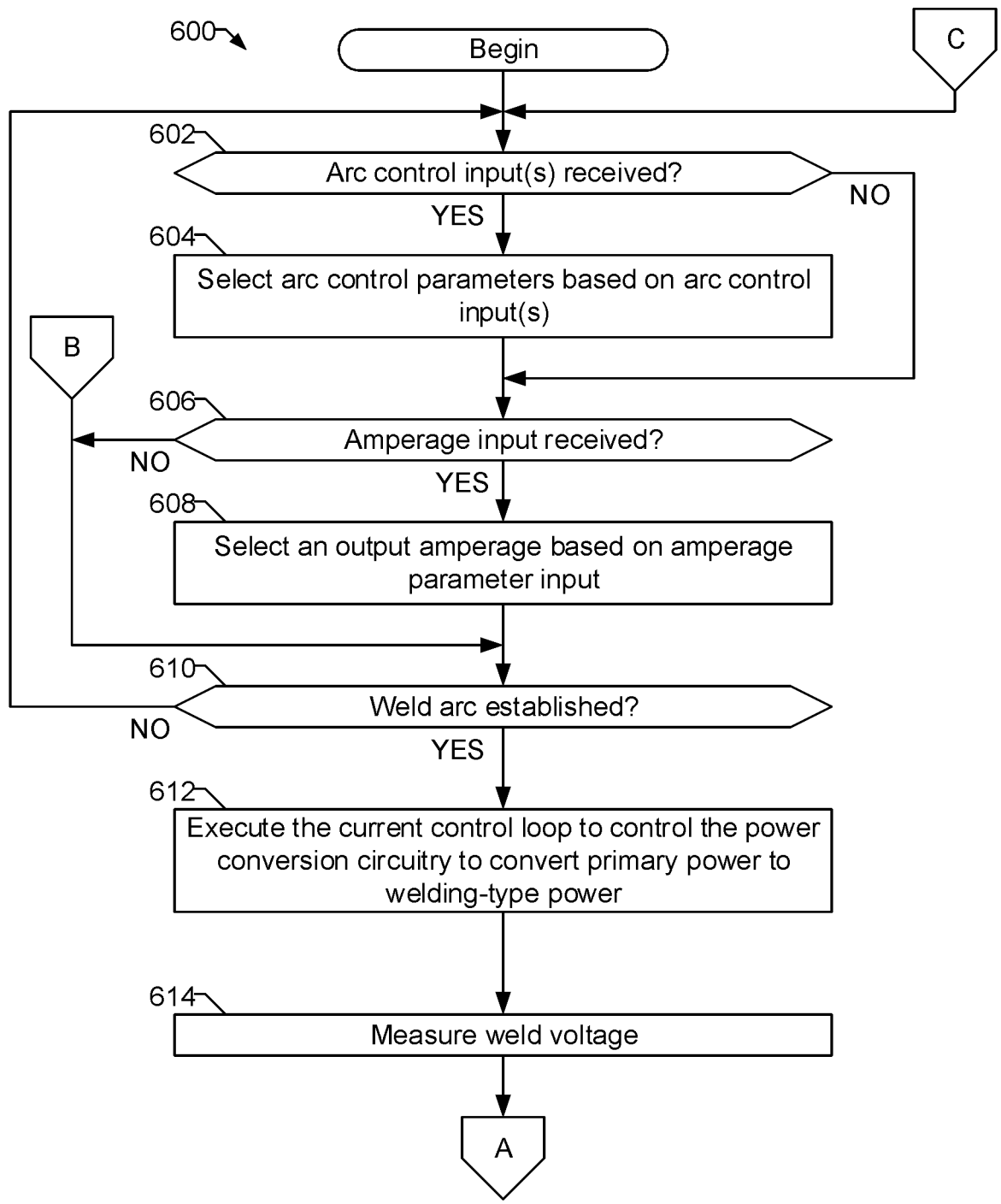
FIGS. 6A and 6B collectively illustrate a flowchart representative of example machine readable instructions which may be executed by the example welding power supply of FIG. 1 to provide power for a welding operation.
Figure 6B:
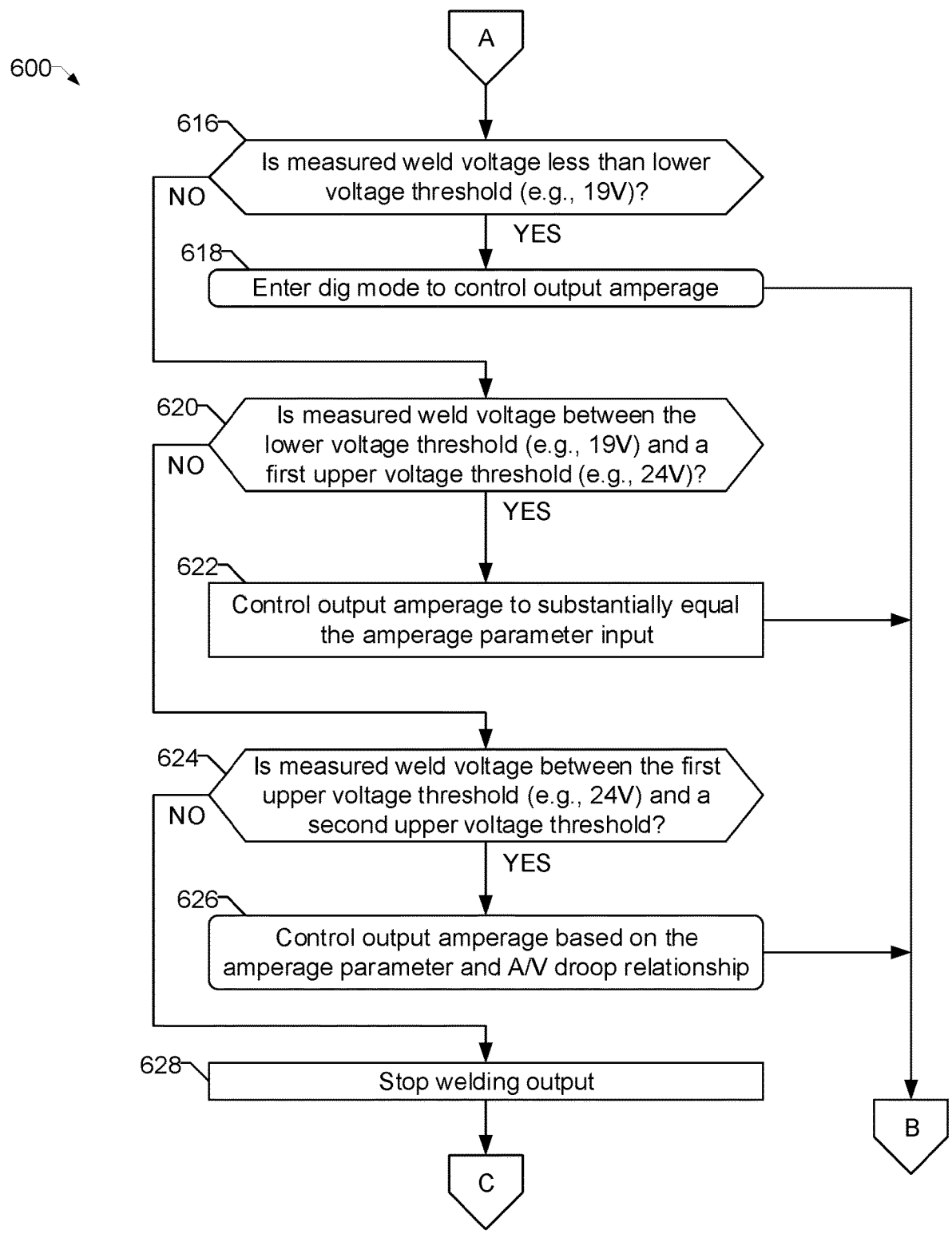

FIGS. 6A and 6B illustrate a flowchart representative of example machine readable instructions which may be executed by the example welding power supply 100 of FIG. 1 to provide power for a welding operation.

At block 602, the control circuitry 106 determines whether one or more arc control input(s) have been received. The example arc control input(s) may include any of the arc control input device 504, the dig range input device 506, and/or the slope input device 508, and/or any other input that modifies current parameters. If arc control input(s) have been received (block 602), at block 604 the control circuitry 106 selects arc control parameter(s) based on the arc control inputs. For example, the control circuitry 106 may configure one or more of the amperage parameter 306, the whetting time 308, the current step 310, the first increasing ramp rate 312, the first threshold amperage 314, the second increasing ramp rate 316, the hold amperage 318, the dwell time 320, the first decreasing ramp rate 322, the second threshold amperage 324, the second decreasing ramp rate 326, the increasing ramp rate(s) 404, 410, the hold amperage(s) 406, 412, the upper dig current limit, the amperage-voltage slope in the droop mode, and/or any other parameter.

After selecting the arc control parameters (block 604), or if no arc control input(s) are received (block 602), at block 606 the control circuitry 106 determines whether an amperage input has been received. For example, the control circuitry 106 may monitor for inputs to the amperage input device 502 specifying an output amperage. If an amperage input has been received (block 606), at block 608 the control circuitry 106 selects an output amperage based on the amperage parameter input. The control circuitry 106 uses the output amperage within the output voltage range 210 of FIG. 2.

After selecting the output amperage (block 604), or if no amperage input is received (block 606), at block 610 the control circuitry 106 determines whether the welding arc is established. For example, the control circuitry 106 may determine whether the current control loop is executing for controlling the power conversion circuitry 102. If the arc is not established (block 610), control returns to block 602.

If the welding arc is established (block 610), at block 612 the control circuitry 106 executes the current control loop to control the power conversion circuitry 102 to convert the primary power 112 to welding-type power. At block 614, the voltage sense circuit 104 and/or the voltage compensator 118 measure the weld voltage (e.g., the power supply output voltage, the arc voltage, etc.).

Turning to FIG. 6B, at block 616 the control circuitry 106 (e.g., via the voltage comparator 108) determines whether the measured weld voltage is less than a lower threshold voltage (e.g., the voltage limit 202). If the measured weld voltage is less than the lower voltage limit 202 (block 616), at block 618 the control circuitry 106 enters a dig mode to control the output amperage. An example method to implement block 618 is described below with reference to FIGS. 7A-7C.

If the measured weld voltage is greater than the lower voltage limit 202 (block 616), at block 620 the control circuitry 106 determines whether the measured weld voltage is between the lower voltage limit 202 and a first upper voltage threshold (e.g., the first upper voltage limit 204). If the measured weld voltage is between the lower voltage limit 202 and the first upper voltage limit 204 (block 620), at block 622 the control circuitry 106 controls the power conversion circuitry 102 to control the output amperage to substantially equal the amperage parameter input (e.g., a current-controlled mode).

If the measured weld voltage is not between the lower voltage limit 202 and the first upper voltage limit 204 (block 620), at block 624 the control circuitry 106 determines whether the measured weld voltage is between the first upper voltage limit 204 and a second upper voltage threshold (e.g., the voltage limit 206). If the measured weld voltage is between the first upper voltage limit 204 and the second upper voltage limit 206 (block 624), at block 626 the control circuitry 106 controls the power conversion circuitry 102 to control the output amperage based on the amperage parameter and an amperage-voltage droop relationship. For example, the control circuitry 106 may control the power conversion circuitry 102 to output the welding current based on a voltage-amperage relationship by controlling the power conversion circuitry 102 based on the amperage parameter according to an inverse voltage-amperage relationship (e.g., an increase in voltage results in a decrease in current). The user interface 110 may receive one or more arc control inputs specifying the inverse voltage-amperage relationship, and/or the control circuitry 106 may determine the inverse voltage-amperage relationship based on one or more inputs. An example method to implement block 626 is described below with reference to FIG. 8.

If the measured weld voltage is between the first upper voltage limit 204 and the second upper voltage limit 206 (block 624) (e.g., the voltage sense circuit 104 measures an open circuit voltage), at block 628 the control circuitry 106 controls the power conversion circuitry 102 to stop the welding output and returns control to block 602.

After controlling the power conversion circuitry 102 to control the output amperage in the dig mode (block 618), to equal the amperage parameter input (block 622), or based on the based on the amperage parameter and an amperage-voltage droop relationship (block 626), control returns to block 610.

Figure 7A:
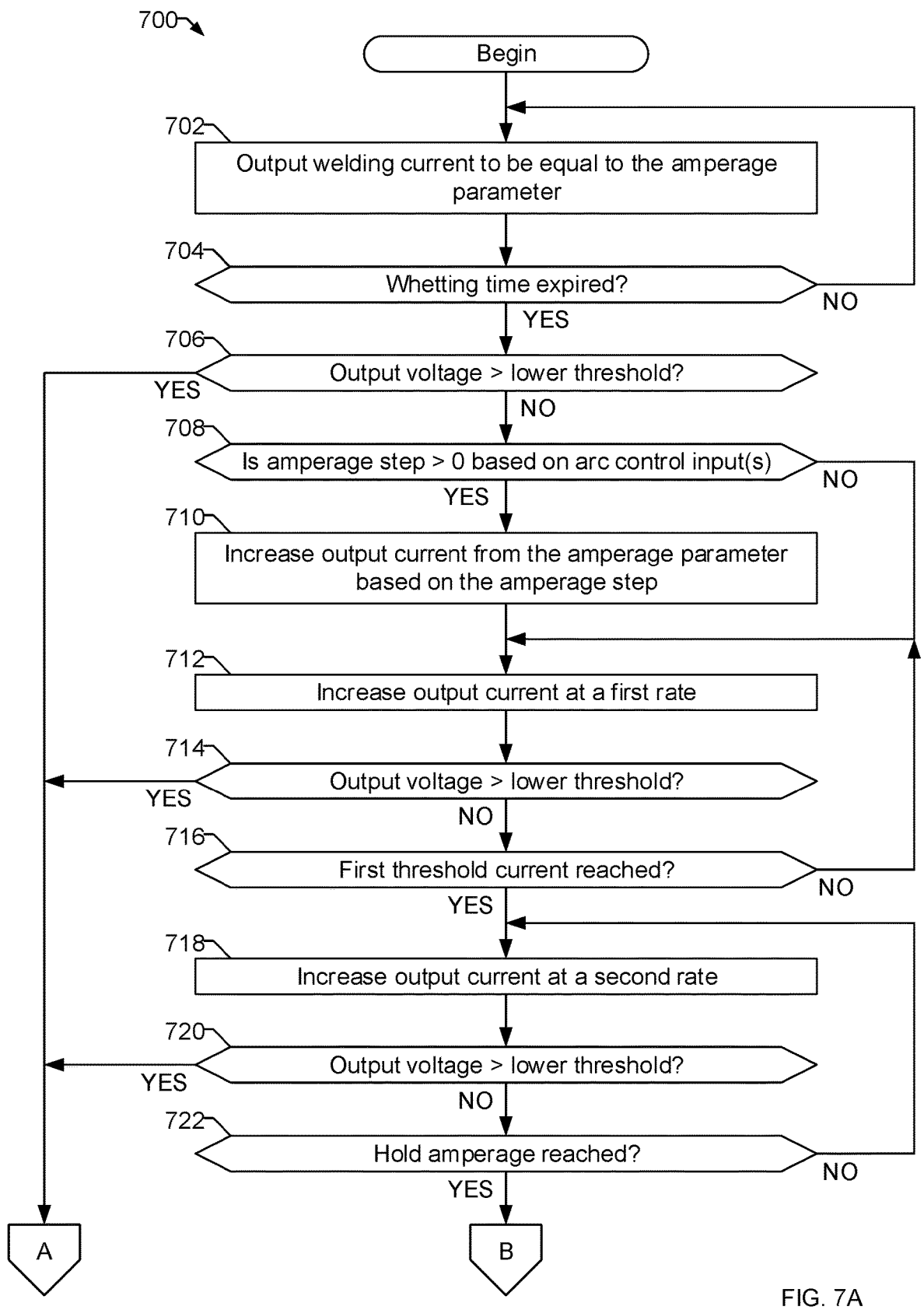
FIGS. 7A-7C collectively illustrate a flowchart representative of example machine readable instructions which may be executed by the example welding power supply of FIG. 1 to execute a dig mode to control output amperage for a welding operation.
Figure 7B:
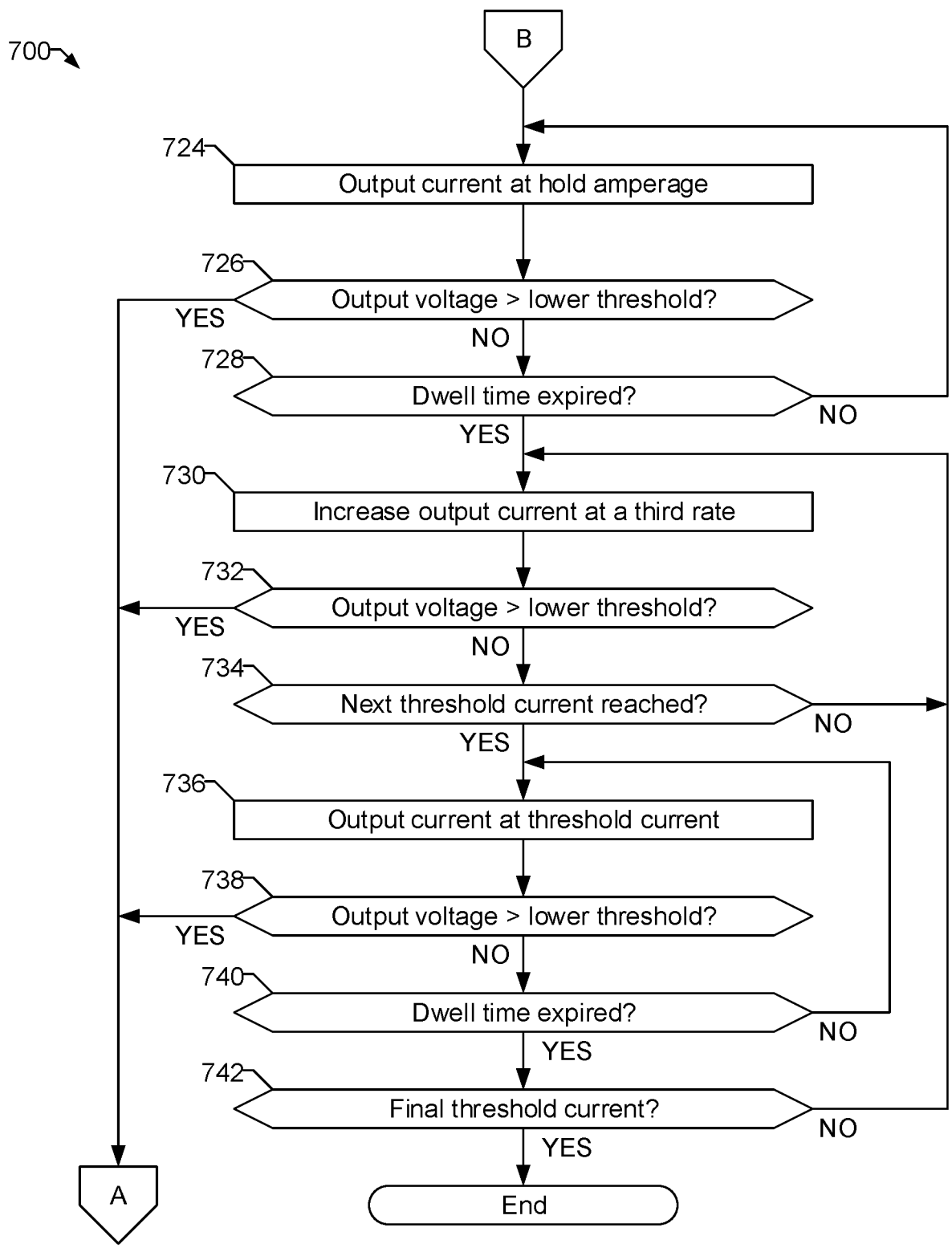
Figure 7C:
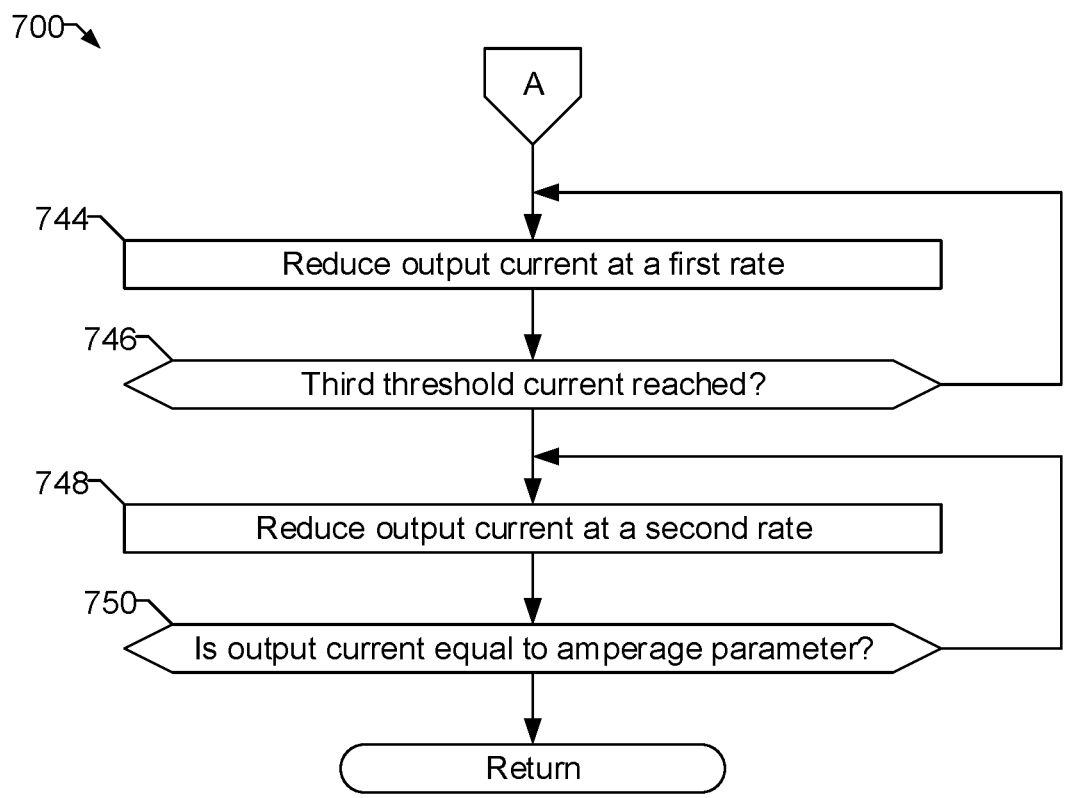

FIG. 7A-7C illustrate a flowchart representative of example machine readable instructions 700 which may be executed by the example welding power supply 100 of FIG. 1 to execute a dig mode to control output amperage for a welding operation. The example instructions 700 may be executed by the control circuitry 106 to implement block 618 of FIG. 6B to control output amperage in a dig mode. The instructions 700 begin execution when the voltage sense monitor 104 detects that the weld voltage is less than the lower voltage limit 202.

At block 702, the control circuitry 106 continues to output the welding current equal to the amperage parameter (e.g., for the whetting time 308 of FIG. 3A). At block 704, the control circuitry 106 determines whether the whetting time has expired. If the whetting time has not expired (block 704), control returns to block 702.

When the whetting time expires (block 704), at block 706 the control circuitry 106 determines whether the output voltage has increased above the lower voltage limit 202 (e.g., whether the short circuit has cleared and the arc reestablished). If the output voltage has not increased above the lower voltage limit 202 (block 706), at block 708 the control circuitry 106 determines whether the amperage step (e.g., the current step 310 of FIG. 3A) is configured to be greater than 0 based on the arc control input(s). If the amperage step is configured to be greater than 0 (block 708), at block 710 the control circuitry 106 increases the output current from the amperage parameter based on the configured amperage step.

After increasing the output current (block 710), or if the amperage step is configured to be 0 (block 708), at block 712 the control circuitry 106 increases the output current at a first rate (e.g., the first increasing ramp rate 312 of FIG. 3A). At block 714, the control circuitry 106 determines whether the output voltage has increased above the lower voltage limit 202. If the output voltage has not increased above the lower voltage limit 202 (block 714), at block 716 the control circuitry 106 determines whether a first threshold current has been reached (e.g., the threshold amperage 314 of FIG. 3A). If the first threshold current has not been reached (block 716), control returns to block 712.

When the first threshold current is reached (block 716), at block 718 the control circuitry 106 increases the output current at a second rate (e.g., the second increasing ramp rate 316 of FIG. 3A). The second rate may be based on the first rate, or vice versa. At block 720, the control circuitry 106 determines whether the output voltage has increased above the lower voltage limit 202. If the output voltage has not increased above the lower voltage limit 202 (block 720), at block 722 the control circuitry 106 determines whether a hold amperage has been reached (e.g., the hold amperage 318 of FIG. 3A). The hold amperage may be determined based on one or more of the arc control input(s) and/or the amperage parameter. If the hold amperage has not been reached (block 722), control returns to block 718.

Turning to FIG. 7B, when the hold amperage is reached (block 722 of FIG. 7A), at block 724 the control circuitry 106 outputs the current at the hold amperage 318. At block 726, the control circuitry 106 determines whether the output voltage has increased above the lower voltage limit 202. If the output voltage has not increased above the lower voltage limit 202 (block 726), at block 728 the control circuitry 106 determines whether a dwell time has expired (e.g., the dwell time 402 of FIG. 4A). If the dwell time 402 has not expired (block 728), control returns to block 724.

When the dwell time 402 has expired (block 728), at block 730 the control circuitry 730 increases the output current at a third rate (e.g., the rate 404 of FIG. 4A). At block 732, the control circuitry 106 determines whether the output voltage has increased above the lower voltage limit 202. If the output voltage has not increased above the lower voltage limit 202 (block 732), at block 734 the control circuitry 106 determines whether the next threshold current has been reached (e.g., the hold amperage 406, the hold amperage 412, and/or other threshold currents). If the next threshold current has not been reached (block 734), control returns to block 730.

If the next threshold current is reached (block 734), at block 736 the control circuitry 106 outputs the current at the hold amperage 406, 412. At block 738, the control circuitry 106 determines whether the output voltage has increased above the lower voltage limit 202. If the output voltage has not increased above the lower voltage limit 202 (block 738), at block 740 the control circuitry 106 determines whether a dwell time has expired (e.g., the dwell time 408, the dwell time 414, etc.). If the dwell time has not expired (block 740), control returns to block 736.

When the dwell time has expired (block 740), at block 742 the control circuitry 106 determines whether the threshold current is a final (e.g., maximum) threshold current to be output by the power conversion circuitry 102. If the threshold current is not a final threshold current (block 742), control returns to block 730. If the threshold current is the final threshold current (block 742), the example instructions 700 end. The example control circuitry 106 may shut down the power output and/or provide an output to the user including an error or other indication that a short circuit could not be cleared.

When the voltage sense circuit 104 determines that the output voltage has increased above the lower voltage limit 202 (block 706, block, 714, block 720, block 726, block 732, block 738), at block 744 (FIG. 7C) the control circuitry 106 begins controlling the power conversion circuitry 102 to reduce the output current at a first rate (e.g., the first decreasing ramp rate 322 of FIG. 3A). At block 746, the control circuitry 106 determines whether a third threshold current has been reached (e.g., the threshold amperage 324 of FIG. 3A). If the third threshold current has not been reached (block 746), control returns to block 744 to continue reducing the current at the first rate.

If the third threshold current has not been reached (block 746), at block 748 the control circuitry 106 begins controlling the power conversion circuitry 102 to reduce the output current at a second rate (e.g., the second decreasing ramp rate 326 of FIG. 3A). At block 750, the control circuitry 106 determines whether the output current is equal to the amperage parameter (block 750). If the output current is still greater than the amperage parameter (block 750), control returns to block 748 to continue reducing the output current at the second rate. When the output current reaches the amperage parameter (block 750), the example instructions 700 end and return control to block 610 of FIG. 6A.

While the example instructions 700 include multiple increasing ramp rates and multiple decreasing ramp rates, the instructions 700 may be modified to include more or fewer increasing ramp rates and/or decreasing ramp rates.

Figure 8:
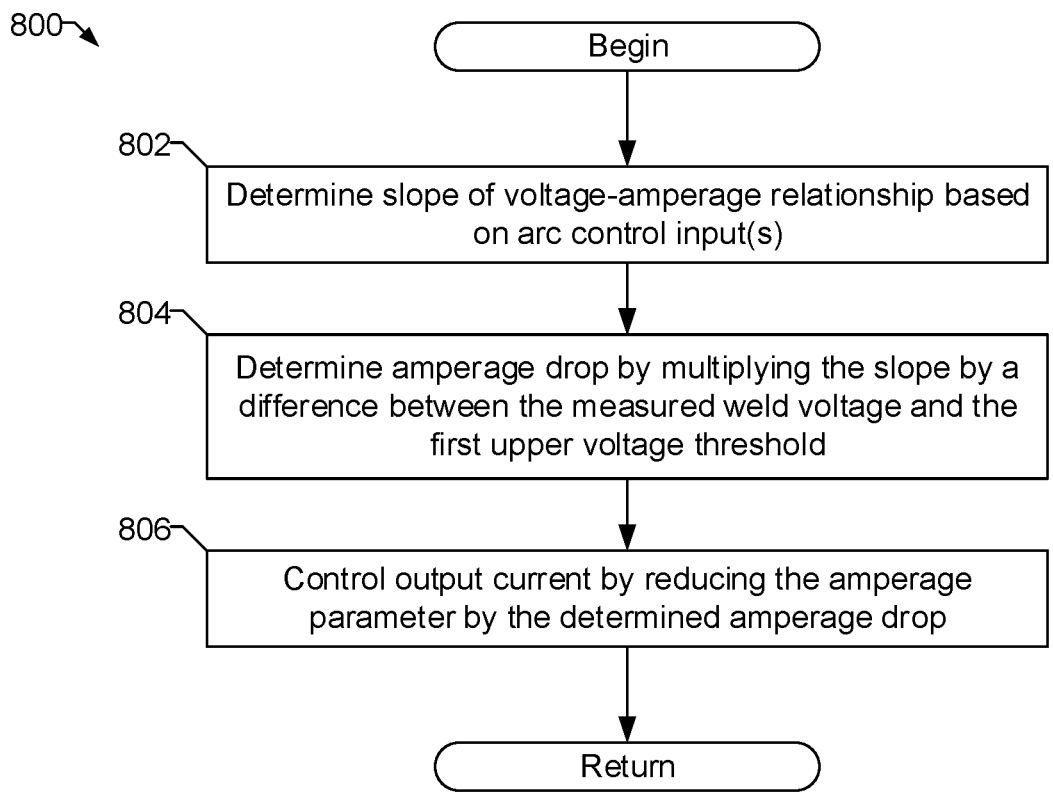
FIG. 8 is a flowchart representative of example machine readable instructions which may be executed by the example welding power supply of FIG. 1 to control an output amperage for a welding operation when the output voltage exceeds a droop threshold.

FIG. 8 is a flowchart representative of example machine readable instructions which may be executed by the example welding power supply of FIG. 1 to control an output amperage for a welding operation when the output voltage exceeds a droop threshold. The example instructions 800 may be executed by the example control circuitry 106 to implement block 626 of FIG. 6B to control the output amperage based on the amperage parameter and an amperage-voltage relationship.

At block 802, the control circuitry 106 determines the slope of the voltage-amperage relationship based on one or more arc control input(s). For example, the slope input device 508 of FIG. 5 may enable a weld operator to adjust the slope of the voltage-amperage relationship directly (e.g., within a range of slope values). An example range of slope values is 1.5 amperes per volt (A/V) above the first upper voltage limit to 3.0 A/V above the first upper voltage limit based on the input.

At block 804, the control circuitry 106 determines an amperage drop by multiplying the slope (e.g., −1.5 A/V to −3.0 A/V) by the difference between the measured weld voltage (e.g., measured by the voltage sense circuit 104) and the first upper voltage limit 204. For example, a slope of −2.0 A/V, an amperage parameter of 100 A, and an upper voltage limit 204 of 24V, the control circuitry 106 would determine the amperage drop to be 6 A for a measured weld voltage of 27V, or 5 A for a measured weld voltage of 26V.

At block 806, the control circuitry 106 controls the output current by reducing the amperage parameter by the determined voltage drop. Using the example above (a slope of −2.0 A/V, an amperage parameter of 100 A, and an upper voltage limit 204 of 24V), the control circuitry 106 controls the output current to be 94 A for a measured weld voltage of 27V, or 95 A for a measured weld voltage of 26V.

The example instructions 800 may then end and transfer control to block 610 of FIG. 6A.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

The control circuitry 106 may identify welding conditions of a given weld and automatically find the optimum value of rate of current rise for the welding conditions. An example control circuit implementation may be an Atmel Mega16 microcontroller, a STM32F407 microcontroller, a field programmable logic circuit and/or any other control or logic circuit capable of executing instructions that executes weld control software. The control circuit could also be implemented in analog circuits and/or a combination of digital and analog circuitry. Examples are described herein with reference to an engine-driven stick welder, but may be used or modified for use in any type of high frequency switching power source.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding power supply, comprising:
power conversion circuitry configured to convert supply power to welding current;
a voltage sense circuit configured to measure an output voltage of the power conversion circuitry; and
control circuitry configured to:
in response to detecting that the output voltage is between a first upper voltage limit and a lower voltage limit, control the power conversion circuitry to output the welding current to a welding arc to match an amperage parameter;
in response to detecting that the output voltage is above the first upper voltage limit and below a second upper voltage limit, control the power conversion circuitry to output the welding current to the welding arc based on a first voltage-amperage relationship; and
in response to detecting that the output voltage has decreased below the lower voltage limit:
control an increasing ramp rate of the welding current output by the power conversion circuitry; and
in response to detecting that the output voltage has increased above the lower voltage limit, control a decreasing ramp rate of the welding current output by the power conversion circuitry.

2. The welding power supply as defined in claim 1, further comprising an engine configured to drive a generator, the generator configured to provide the supply power to the power conversion circuitry.

3. The welding power supply as defined in claim 1, further comprising a user interface configured to receive the amperage parameter.

4. The welding power supply as defined in claim 1, wherein the control circuitry is configured to control the power conversion circuitry to output the welding current based on the first voltage-amperage relationship by controlling the power conversion circuitry based on the amperage parameter according to an inverse voltage-amperage relationship.

5. The welding power supply as defined in claim 4, further comprising a user interface configured to receive an input specifying the inverse voltage-amperage relationship, the control circuitry configured to determine the inverse voltage-amperage relationship based on the input.

6. The welding power supply as defined in claim 5, wherein the control circuitry is configured to increase the welding current above the current specified by the amperage parameter between 1.5 amperes per volt (A/V) above the first upper voltage limit and 3.0 A/V above the first upper voltage limit based on the input.

7. The welding power supply as defined in claim 1, wherein the control circuitry is configured to control the increasing ramp rate of the welding current output by the power conversion circuitry by:

controlling the power conversion circuitry to increase the welding current at a first rate;
controlling the power conversion circuitry to increase the welding current at a second rate less than the first rate; and
controlling the power conversion circuitry to output the welding current at a hold amperage.

8. The welding power supply as defined in claim 7, further comprising an input device configured to receive an input, the control circuitry configured to control, based on the input, one or more of: the amperage parameter, the first rate, the second rate, the hold amperage, or the first voltage-amperage relationship.

9. The welding power supply as defined in claim 7, wherein the control circuitry is configured to:
control the power conversion circuitry to increase the welding current at the first rate up to a first threshold amperage; and
control the power conversion circuitry to increase the welding current at the second rate from the first threshold amperage to the hold amperage.

10. The welding power supply as defined in claim 9, further comprising an input device configured to receive an input, the control circuitry configured to control, based on the input, one or more of: the amperage parameter, the first rate, the second rate, the hold amperage, the first threshold amperage, or the first voltage-amperage relationship.

11. The welding power supply as defined in claim 7, wherein the control circuitry is configured to:
control the power conversion circuitry to continue to output the welding current at the amperage parameter for a first time period following detecting that the output voltage has decreased below the lower voltage limit;
after the first time period, control the power conversion circuitry to increase the welding current from the amperage parameter by an amperage step; and
control the power conversion circuitry to begin the increasing of the welding current at the first rate.

12. The welding power supply as defined in claim 7, wherein the control circuitry is configured to:
in response to detecting that the output voltage has not increased above the lower voltage limit within a threshold time period while controlling the power conversion circuitry to output the welding current at the hold amperage:
increase the welding current at a third rate up to a second hold amperage; and
control the power conversion circuitry to output the welding current at the second hold amperage.

13. The welding power supply as defined in claim 7, wherein the control circuitry is configured to control the decreasing ramp rate of the welding current output by the power conversion circuitry by:
controlling the power conversion circuitry to decrease the welding current at a third rate; and
controlling the power conversion circuitry to decrease the welding current at a fourth rate less than the third rate.

14. The welding power supply as defined in claim 13, wherein the control circuitry is configured to control the power conversion circuitry to decrease the welding current at the third rate until the welding current satisfies a threshold or for a threshold time period.

15. The welding power supply as defined in claim 13, wherein the third rate is based on the first rate and the fourth rate is based on the second rate.

16. The welding power supply as defined in claim 7, wherein the second rate is between 0.5 amperes per 100 microseconds (A/µs) and 2.5 amperes per 100 microseconds.

17. The welding power supply as defined in claim 16, wherein the first rate is based on the second rate.

18. The welding power supply as defined in claim 1, wherein the first upper voltage limit is between 23 and 24 volts.

19. The welding power supply as defined in claim 1, wherein the lower voltage limit is between 18.5 and 19.5 volts.

20. The welding power supply as defined in claim 19, wherein the lower voltage limit is 19 volts.

* * * * *